(12) United States Patent
Demir et al.

(10) Patent No.: US 11,506,502 B2
(45) Date of Patent: Nov. 22, 2022

(54) ROBUST LOCALIZATION

(71) Applicant: Honda Motor Co., Ltd., Tokyo (JP)

(72) Inventors: Mahmut Demir, San Jose, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 323 days.

(21) Appl. No.: 16/823,881

(22) Filed: Mar. 19, 2020

(65) Prior Publication Data
US 2021/0010814 A1    Jan. 14, 2021

Related U.S. Application Data

(60) Provisional application No. 62/873,568, filed on Jul. 12, 2019.

(51) Int. Cl.
    *G01C 21/30*  (2006.01)
    *G01S 13/89*  (2006.01)
    *G01S 19/49*  (2010.01)

(52) U.S. Cl.
    CPC .............. *G01C 21/30* (2013.01); *G01S 13/89* (2013.01); *G01S 19/49* (2013.01)

(58) Field of Classification Search
    CPC .......... G01C 21/30; G01S 13/89; G01S 19/49
    See application file for complete search history.

(56) References Cited

U.S. PATENT DOCUMENTS

| | | | | |
|---|---|---|---|---|
| 10,969,474 | B2* | 4/2021 | O'Keeffe | G01S 17/42 |
| 2018/0059248 | A1* | 3/2018 | O'Keeffe | G01S 17/42 |
| 2019/0311546 | A1* | 10/2019 | Tay | G06T 5/50 |

OTHER PUBLICATIONS

N. Akai, L. Y. Morales, and H. Murase, "Reliability estimation of vehicle localization result," in 2018 IEEE Intelligent Vehicles Symposium (IV). IEEE, 2018, pp. 740-747.

N. Akai, L. Y. Morales, T. Hirayama, and H. Murase, "Toward localization-based automated driving in highly dynamic environments: Comparison and discussion of observation models," in 2018 21st International Conference on Intelligent Transportation Systems (ITSC). IEEE, 2018, pp. 2215-2222.

(Continued)

*Primary Examiner* — Bryan Bui
(74) *Attorney, Agent, or Firm* — Rankin, Hill & Clark LLP (57) ABSTRACT

According to one aspect, a system for robust localization may include a scan accumulator, a scan matcher, a transform maintainer, and a location fuser. The scan accumulator may receive a set of sensor data from a set of sensors mounted on a vehicle. The scan accumulator may generate a sensor scan point cloud output by transforming the set of sensor data from each sensor frame to a corresponding vehicle frame and calculate a fitness score, a transformation probability, and a mean elevation angle used to determine a scan confidence for the sensor data. The transform maintainer may receive GPS data, the scan confidence, and the matched sensor scan point cloud output and map tile point cloud data from the scan matcher, and determine whether the GPS data or the matched sensor scan point cloud output and map tile point cloud data is utilized for a map-to-odometer transformation output.

20 Claims, 7 Drawing Sheets

(56) References Cited

OTHER PUBLICATIONS

N. Akai, L. Y. Morales, T. Yamaguchi, E. Takeuchi, Y. Yoshihara, H. Okuda, T. Suzuki, and Y. Ninomiya, "Autonomous driving based on accurate localization using multilayer lidar and dead reckoning," in 2017 IEEE 20th International Conference on Intelligent Transportation Systems (ITSC). IEEE, 2017, pp. 1-6.

N. Akai, L. Y. Morales, E. Takeuchi, Y. Yoshihara, and Y. Ninomiya, "Robust localization using 3d ndt scan matching with experimentally determined uncertainty and road marker matching," in 2017 IEEE Intelligent Vehicles Symposium (IV). IEEE, 2017, pp. 1356-1363.

R. Dubé, D. Dugas, E. Stumm, J. Nieto, R. Siegwart, and C. Cadena, "Segmatch: Segment based place recognition in 3d point clouds," in 2017 IEEE International Conference on Robotics and Automation (ICRA). IEEE, 2017, pp. 5266-5272.

W. Hess, D. Kohler, H. Rapp, and D. Andor, "Real-time loop closure in 2d lidar slam," in 2016 IEEE International Conference on Robotics and Automation (ICRA). IEEE, 2016, pp. 1271-1278.

E. Javanmardi, M. Javanmardi, Y. Gu, and S. Kamijo, "Adaptive resolution refinement of ndt map based on localization error modeled by map factors," in 2018 21st International Conference on Intelligent Transportation Systems (ITSC). IEEE, 2018, pp. 2237-2243.

Ehsan Javanmardi, Mahdi Javanmardi, Yanlei Gu, Shunsuke Mahdimijo, "Autonomous vehicle self-localization based on multilayer 2D vector map and multi-channel LiDAR," IV 2017.

E. Javanmardi, M. Javanmardi, Y. Gu, and S. Kamijo, "Factors to evaluate capability of map for vehicle localization," IEEE Access, vol. 6, pp. 49 850-49 867, 2018.

M. Magnusson, A. Lilienthal, and T. Duckett, "Scan registration for autonomous mining vehicles using 3d-ndt," Journal of Field Robotics, vol. 24, No. 10, pp. 803-827, 2007.

M. Magnusson, A. Nuchter, C. Lorken, A. J. Lilienthal, and J. Hertzberg, "Evaluation of 3d registration reliability and speed-a comparison of icp and ndt," in 2009 IEEE International Conference on Robotics and Automation. IEEE, 2009, pp. 3907-3912.

G. Wan, X. Yang, R. Cai, H. Li, Y. Zhou, H. Wang, and S. Song, "Robust and precise vehicle localization based on multi-sensor fusion in diverse city scenes," in 2018 IEEE International Conference on Robotics and Automation (ICRA) IEEE, 2018, pp. 4670-4677.

W. Wen, X. Bai, W. Zhan, M. Tomizuka, and L.-T. Hsu, "Uncertainty estimation of lidar matching aided by dynamic vehicle detection and high definition map," Electronics Letters, 2019.

J. Zhang and S. Singh, "Low-drift and real-time lidar odometry and mapping," Autonomous Robots, vol. 41, No. 2, pp. 401-416, 2017.

International Search Report and Written Opinion of PCT/US20/40268 dated Sep. 28, 2020, 7 pages.

S. Kato, E. Takeuchi, Y. Ishiguro, Y. Ninomiya, K. Takeda, and T. Hamada, "An open approach to autonomous vehicles," IEEE Micro, vol. 35, No. 6, pp. 60-68, 2015.

T. Moore and D. Stouch, "A generalized extended kalman filter implementation for the robot operating system," in Proceedings of the 13th International Conference on Intelligent Autonomous Systems (IAS-13). Springer, Jul. 2014.

C. Zhang, M. H. Ang, and D. Rus, "Robust lidar localization for autonomous driving in rain," in 2018 IEEE/RSJ International Conference on Intelligent Robots and Systems (IROS). IEEE, 2018, pp. 3409-3415.

* cited by examiner

FIG. 8 ically challenging environmental conditions, may be difficult. Further, it may be desirable for localization results to be fail-safe, failure aware, and/or resource aware.

ROBUST LOCALIZATION

CROSS-REFERENCE TO RELATED APPLICATIONS

This application claims the benefit of U.S. Provisional Patent Application, Ser. No. 62/873,568 entitled "ROBUST LOCALIZATION WITH LOW-MOUNTED MULTIPLE LIDARS IN URBAN ENVIRONMENTS", filed on Jul. 12, 2019; the entirety of the above-noted application(s) is incorporated by reference herein.

BACKGROUND

Achieving robust localization under a variety of conditions, such as challenging environmental conditions, may be difficult. Further, it may be desirable for localization results to be fail-safe, failure aware, and/or resource aware.

BRIEF DESCRIPTION

According to one aspect, a system for robust localization may include a scan accumulator, a scan matcher, a transform maintainer, and a location fuser. The scan accumulator may receive a set of sensor data from a set of sensors mounted on a vehicle. Each sensor data of the set of sensor data may be associated with a different field-of-view (FOV). Each sensor data of the set of sensor data may include one or more sensor frames associated with one or more corresponding timestamps. The scan accumulator may generate a sensor scan point cloud output by transforming the set of sensor data from each sensor frame to a corresponding vehicle frame.

The scan matcher may receive map tile point cloud data from a map tile server and the sensor scan point cloud output from the scan accumulator. The map tile point cloud data may be indicative of transformed point cloud data associated with a coarse vehicle location. The scan matcher may determine a match based on the sensor scan point cloud output and the map tile point cloud data.

The scan matcher may calculate a fitness score, a transformation probability, and a mean elevation angle and determine a scan confidence associated with the sensor scan point cloud output based on the fitness score, the transformation probability, and the mean elevation angle.

The transform maintainer may receive global positioning system (GPS) data from a GPS unit, the scan confidence, and the matched sensor scan point cloud output and map tile point cloud data from the scan matcher. The transform maintainer may generate a map-to-odometer transformation output based on the scan confidence, the GPS data, and the matched sensor scan point cloud output and map tile point cloud data.

The location fuser may perform data fusion on controller area network (CAN) data and inertial measurement unit (IMU) data and generate an odometer-to-vehicle transformation output based on the CAN data and the IMU data.

The scan matcher may calculate a localization confidence based on the scan confidence using recursive Bayesian updating. The transform maintainer may generate the map-to-odometer transformation output based on the localization confidence, the GPS data, and the matched sensor scan point cloud output and map tile point cloud data. The transform maintainer may generate the map-to-odometer transformation output based on the GPS data when the scan confidence is less than a scan confidence threshold and when the localization confidence is less than a localization confidence threshold. The transform maintainer may generate the map-to-odometer transformation output based on the matched sensor scan point cloud output and map tile point cloud data when the scan confidence is greater than a scan confidence threshold and when the localization confidence is greater than a localization confidence threshold.

The scan matcher may determine the match between the sensor scan point cloud output and the map tile point cloud data based on a normal distribution transform (NDT). The fitness score may represent an average distance between the sensor scan point cloud output and the map tile point cloud. The transformation probability may represent an accumulated mahalanobis distance associated with NDT optimization. The mean elevation angle may represent an amount of FOV blocked by obstacles surrounding the vehicle. For example, the mean elevation angle may be determined by finding scan points corresponding to vehicles or other obstacles, calculating an elevation angle at each discrete angle, and calculating a mean elevation angle based thereon.

The scan confidence may be calculated as a weighted sum of the fitness score, the transformation probability, and the mean elevation angle. The map tile point cloud data may be represented as a voxel associated with a mean and a covariance. The scan accumulator may project the set of sensor data back to a common timestamp. The set of sensors may include a light detection and ranging (LiDAR) sensor, a radar sensor, or an image capture sensor. The location fuser may perform data fusion using an extended Kalman filter (EKF).

According to one aspect, a method for robust localization may include receiving a set of sensor data from the set of sensors mounted on a vehicle, each sensor data of the set of sensor data may be associated with a different field-of-view (FOV), each sensor data of the set of sensor data including one or more sensor frames associated with one or more corresponding timestamps, generating a sensor scan point cloud output by transforming the set of sensor data from each sensor frame to a corresponding vehicle frame, receiving map tile point cloud data from a map tile server and the sensor scan point cloud output, the map tile point cloud data may be indicative of transformed point cloud data associated with a coarse vehicle location, determining a match based on the sensor scan point cloud output and the map tile point cloud data, calculating a fitness score, a transformation probability, and a mean elevation angle and determining a scan confidence associated with the sensor scan point cloud output based on the fitness score, the transformation probability, and the mean elevation angle, receiving global positioning system (GPS) data, the scan confidence, and the matched sensor scan point cloud output and map tile point cloud data and generating a map-to-odometer transformation output based on the scan confidence, the GPS data, and the matched sensor scan point cloud output and map tile point cloud data, and performing data fusion on controller area network (CAN) data and inertial measurement unit (IMU) data and generating an odometer-to-vehicle transformation output based on the CAN data and the IMU data.

The method for robust localization may include calculating a localization confidence based on the scan confidence using recursive Bayesian updating, generating the map-to-odometer transformation output based on the GPS data when the scan confidence is less than a scan confidence threshold and when the localization confidence is less than a localization confidence threshold, generating the map-to-odometer transformation output based on the matched sensor scan point cloud output and map tile point cloud data when the scan confidence is greater than a scan confidence threshold and when the localization confidence is greater than a localization confidence threshold, or determining the match between the sensor scan point cloud output and the map tile point cloud data based on a normal distribution transform (NDT).

According to one aspect, a system for robust localization may include a scan accumulator, a scan matcher, a transform maintainer, and a location fuser. The scan accumulator may receive a set of sensor data from a set of sensors mounted on a vehicle, and each may be associated with different field-of-view (FOV). The scan accumulator may generate a sensor scan point cloud output by transforming the set of sensor data from each sensor frame to a corresponding vehicle frame.

The scan matcher may receive map tile point cloud data from a map tile server and the sensor scan point cloud output from the scan accumulator, the map tile point cloud data indicative of transformed point cloud data. The scan matcher may determine a match based on the sensor scan point cloud output and the map tile point cloud data.

The scan matcher may calculate a fitness score, a transformation probability, and a mean elevation angle and determines a scan confidence associated with the sensor scan point cloud output based on the fitness score, the transformation probability, and the mean elevation angle. The scan matcher may calculate a localization confidence based on the scan confidence using recursive Bayesian updating.

The transform maintainer may generate a map-to-odometer transformation output based on global positioning system (GPS) data from a GPS unit, the scan confidence, the localization confidence, and the matched sensor scan point cloud output and map tile point cloud data from the scan matcher.

The location fuser may perform data fusion on controller area network (CAN) data and inertial measurement unit (IMU) data and generating an odometer-to-vehicle transformation output based on the CAN data and the IMU data.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
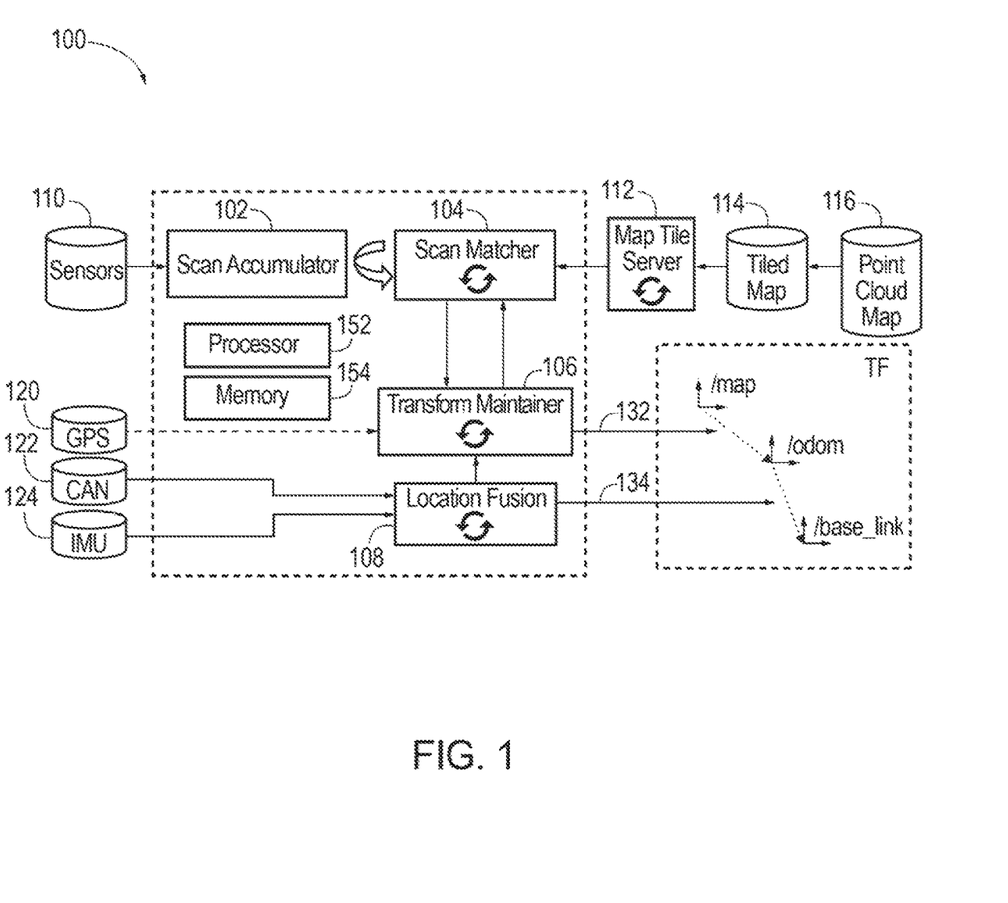
FIG. 1 is an exemplary component diagram of a system for robust localization, according to one aspect.

FIG. 1 is an exemplary component diagram of a system 100 for robust localization, according to one aspect. According to one aspect, a system 100 for robust localization may include a scan accumulator 102, a scan matcher 104, a transform maintainer 106, and a location fuser 108. The scan accumulator 102 may receive a set of sensor data from a set of sensors 110 mounted on a vehicle. The set of sensors 110 may include a light detection and ranging (LiDAR) sensor, a radar sensor, or an image capture sensor. Sensors may be mounted on the vehicle in different locations or positions on the vehicle (e.g., driver-side passenger side, front, rear, center, any combination thereof, etc.).

Each sensor data of the set of sensor data may be associated with a different field-of-view (FOV). Each sensor data of the set of sensor data may include one or more sensor frames associated with one or more corresponding timestamps. The sensor data may be received by the scan accumulator 102, which may accumulate and merge multiple scans (e.g., scan sensor data) from different sensors using the time-stamp information, and information associated with the position of each of the set of sensors 110. The scan accumulator 102 may generate a sensor scan point cloud output by transforming the set of sensor data from each sensor frame to a corresponding vehicle frame. In other words, the scan accumulator 102 may transform each sensor data to a common coordinate frame and project the same back to a common time.

The scan accumulator 102 may project the set of sensor data back to a common timestamp. The scan accumulator 102 may transform each scan or sensor data from corresponding sensor frame to the "vehicles" frame using pre-calculated sensor-to-vehicle calibration values and project each point in the sensor data to a common target time using motion estimated from dead reckoning. In this way, the scan accumulator 102 may provide motion localization to project the sensor data to the same timestamp, thereby enabling the scan matcher 104 to consume or utilize this data. Thus, the scan matcher 104 may receive the sensor scan point cloud output from the scan accumulator 102. The timestamp of a first scan in the accumulation of sensor day may be the common target time, for example.

The scan matcher 104 may receive map tile point cloud data from a map tile server 112 in addition to the sensor scan point cloud output from the scan accumulator 102. The map tile point cloud data may be indicative of transformed point cloud data associated with a coarse vehicle location and be built using a reference set of sensors 110. The point cloud data 116 from the map tile server 112 (e.g., map tile point cloud data) may be represented in a local coordinate frame, but the transformation from local to UTM coordinate frame may also be available. The map tile point cloud data may include static features, ground surfaces, features of the environment, layout of the environment, etc. from the real-world environment or operating environment to be localized. The map tile point cloud data will generally exclude dynamic objects from the real-world environment or operating environment to be localized. In other words, during generation or creation of the map tile point cloud data, dynamic objects may be filtered from this dataset.

The map tile point cloud data may be represented as a voxel associated with a mean and a covariance. For example, map tiles 114 may be 'tiles' around the vehicle which may be loaded at runtime (e.g., as the vehicle is passing through the operating environment). These 'tiles' may be of a predetermined size (e.g., 1 km$^2$) and stored and loaded in a NDT compatible format, for example. According to one exemplary implementation, 1 voxel=mean (3×1)+ covariance (3×3). Each voxel may be represented with a mean ($\mu$) and a covariance ($\Sigma$).

The scan matcher 104 may determine a match based on the sensor scan point cloud output (e.g., sensor point cloud) and the map tile point cloud data (e.g., the reference point cloud). In other words, the scan matcher 104 may determine whether a match between the map tile point cloud data from a map tile server 112 and the sensor scan point cloud output exists. The scan matcher 104 may determine the match between the sensor scan point cloud output and the map tile point cloud data based on a normal distribution transform (NDT), which may be associated with a memory-efficient representation of the scan surface. Other point cloud matching algorithms may also be utilized. The scan matcher 104 may provide a reliable registration of the point cloud data, be memory efficient, provide sub-voxel accuracy, among other things.

To increase the robustness and provide consistently smooth localization output, sensor or LiDAR localization is fused with the dead reckoning using the probabilistic scan matching confidence estimation. The scan matcher 104 may calculate a fitness score, a transformation probability, and a mean elevation angle and determine a scan confidence associated with the sensor scan point cloud output based on the fitness score, the transformation probability, and the mean elevation angle. The scan confidence may be calculated as a weighted sum of the fitness score, the transformation probability, and the mean elevation angle. The fitness score may represent an average distance between the sensor scan point cloud output and the map tile point cloud. The transformation probability may represent an accumulated mahalanobis distance associated with NDT optimization. The mean elevation angle may represent an amount of FOV blocked by obstacles surrounding the vehicle. According to one aspect, the mean elevation angle may be utilized to calculate a mean elevation score, which decreases as an ego-vehicle (e.g., the vehicle equipped with the system 100 for robust localization) is surrounded by more vehicles. Additionally, the scan matcher 104 may calculate a localization confidence based on the scan confidence using recursive Bayesian updating.

In order to calculate scan match confidence $p_{scan}$, fitness score $p_f$, and transformation probability $p_t$, a number of iterations $n_i$ values available in the PCL implementation of NDT algorithm may be utilized. Another criteria mean elevation angle $p_{mea}$ may also be utilized to calculate how much of the sensor FOV is blocked by the dynamic objects.

The first metric, fitness score, may be inversely proportional to the average distance of each point in the scan to the corresponding closest point in the map. However, existence of non-mapped objects such as dynamic objects decreases the fitness score even if the scan matching is successful (e.g., match determined to exist). Conversely, fitness score may be high due to the existence of local minima which may cause the scan matcher 104 to fail and not find a match. This may occur in certain roads with local similarities in the longitudinal travel direction. Effect of non-mapped objects in the fitness score calculation may be minimized by treating points in the scan as outliers if the distance to the corresponding closest point in the map is greater than a threshold $\tau_{outlier}$. The second metric, the transformation probability, may be an indicator of how good scan is converged to the mapped points.

The mean elevation angle $p_{mea}$ metric may be utilized to measure how much of the mapped objects can be observed by the sensors in the presence of dynamic objects. Here, sensor points corresponding to dynamic objects (e.g., obstacles) may be obtained by first projecting 3D points into the 2D image plane and checking if the projected point is inside any of the vehicle bounding boxes generated by image object detection. If sensors are blocked by a dynamic vehicle at a certain horizontal angle, multiple rays at different vertical angles will hit to the dynamic vehicle on the road. If the sensor is not obstructed, then most of the vertical rays will hit to the mapped objects outside of the road. The maximum vertical ray angle across each azimuth angle can be used as an indicator of how much of sensor rays is blocked at each azimuth. Then, the mean of elevation angle may be used at each azimuth step as an uncertainty metric. Because the localization confidence may change from area to area, the log–odds may be limited in order to calculate probability of confidence only from the recent measurements. Bayesian update rule may be represented in log–odds form $l_t(.)$ in order to ensure numerical stability.

When $p_{mea}$ is greater, this is indicative of more sensor rays being blocked by dynamic objects and the confidence of localization will decrease as the scan may have less number of points to match to the mapped points. Once each metric is calculated, the probability of scan confidence $p_{scan}$ may be determined by taking a weighted sum of three metrics as shown in Eq. 1 below.

$$p_{scan}=0.3\times p_f+0.3\times p_t+0.4\times p_{mea} \quad (1)$$

The localization confidence $p_{conf}$ may be calculated based on $p_{scan}$ using the recursive Bayesian update rule given in Eq. 2.

$$l_t(p_{conf}^t)=\log(p_{scan}^t)+l_{t-1}(p_{conf}^{t-1}) \quad (2)$$

If $p_{conf}>\tau_{conf}$ and $p_{scan}>\tau_{good}$, the scan match result may be utilized for correction. On the other hand, if $p_{conf}<\tau_{lost}$, the initialization method or procedure may be triggered or initialized. The scan match result may be used for correction if the number of NDT iterations is not capped at the maximum limit. Otherwise matching result may be used to update the initial pose guess of the next scan matching.

Initialization method: In order for NDT to converge, initial pose estimate should be in close neighborhood of the optimal pose. Furthermore, sensor localization may lose track during the course of localization for various reasons. Initialization procedure aims to find a good initial pose estimate that is close enough for the scan matcher 104 to converge. This method is not intended to initialize from an arbitrary pose. Rather, it assumes a vicinity of optimal pose, but not close enough.

Because rough information about the vehicle position may be known, a search in the vicinity of that position may be performed. As such, an initialization pattern to pick from initial pose candidates in an order and check if any of those candidates makes the scan matcher 104 to converge and achieve high localization confidence, $p_{conf} \geq \tau_{conf}$. For example, $p_{conf}$ may be set to 0.5 in the beginning of the initialization and the scan matcher 104 run on subsequent scans. If $p_{conf}$ decreases below $\tau_{lost}$ again, another initial pose candidate may be selected and so on. This may be repeated until a high confidence is achieved.

By calculating the fitness score, the transformation probability, the mean elevation angle, the scan confidence, and the localization confidence, localization uncertainty estimation may be provided (these outputs may be considered scan matching results). An estimation of whether data is valid is made prior to using that data. The scan confidence may provide the scan matching uncertainty estimation. This uncertainty estimation may be aided by dynamic vehicle detection and HD-map data, for example. Because failure-aware scan matching may be provided, dynamic environments may have less of an impact on the robustness of localization. Using the scan matching results (e.g., the fitness score, the transformation probability, the mean elevation angle, the scan confidence, and the localization confidence, localization uncertainty estimation, etc.), a correction transform (herein map-to-odometer transformation output) may be calculated by the transform maintainer 106.

The transform maintainer 106 may receive global positioning system (GPS) data 120 from a GPS unit, the scan confidence and/or the localization confidence, and the matched sensor scan point cloud output and map tile point cloud data from the scan matcher 104. If the scan confidence and/or the localization confidence is indicative that the data from the sensors is 'good' or above some threshold, the sensor data may be utilized. If the scan confidence and/or the localization confidence is indicative that the data from the sensors is 'faulty' or below some threshold, the GPS data 120 may be utilized by the transform maintainer 106, thereby facilitating correction within the system 100 for robust localization. In this way, a continuous and smooth localization output may be obtained, even when a sensor failure occurs. The transform maintainer 106 may thus provide this map-odometer transformation, which may be indicative of the position of the vehicle using global coordinates. Thus, the transform maintainer 106 takes the position of the vehicle from the local odometer frame to the global frame. When, for example, the GPS or LIDAR sensors are unavailable (e.g., the sources to predict global position), the odometer frame information provided by CAN data 122 from the CAN may be indicative of relative position with respect to past measurements. The transform maintainer 106 may maintain global accurate positioning. When scan matching results are not available or when GPS is not sufficiently accurate, localization from the odometer may be utilized by the transform maintainer 106 because this map to odometer frame doesn't change much during this time. Once GPS or sensor data is sufficiently accurate, any corrections may be applied.

The transform maintainer 106 may generate a map-to-odometer transformation output 132 based on the scan confidence, the GPS data 120, and the matched sensor scan point cloud output and map tile point cloud data. For example, the transform maintainer 106 may generate the map-to-odometer transformation output 132 based on the GPS data 120 when the scan confidence is less than a scan confidence threshold and when the localization confidence is less than a localization confidence threshold. Conversely, the transform maintainer 106 may generate the map-to-odometer transformation output 132 based on the matched sensor scan point cloud output and map tile point cloud data when the scan confidence is greater than a scan confidence threshold and when the localization confidence is greater than a localization confidence threshold. The transform maintainer 106 may also fuse dead reckoning results with scan matcher 104 results.

According to one aspect, if the scan confidence is less than the scan confidence threshold and the localization confidence is less than the localization confidence threshold, both the GPS data 120 and the sensor data may be discarded, and the last or previous known position may be utilized. Thus, even when no scan matching results are available, the previous scan matching result may provide the transformation between the map to odometer, and the odometer results from the CAN may be utilized to determine a current position in lieu of GPS data 120 or sensor data for the time being. In this way, dead reckoning (e.g., from the CAN data 122, IMU data 124) may be utilized to provide a continuous and constant rate vehicle pose estimation regardless of the scan matching status.

The location fuser 108 may perform data fusion on CAN data 122 and inertial measurement unit (IMU) data 124 and generate an odometer-to-vehicle transformation output 134 based on the CAN data 122 and the IMU data 124. Odometer matching based on wheel encoder information (CAN data 122) from the CAN may be performed. The location fuser 108 may perform data fusion using an extended Kalman filter (EKF), thereby providing dead reckoning and wheel odometry. A constant velocity omnidirectional motion model may be implemented. To calculate the position of the vehicle in the odometer frame, the location fuser 108 may filter the IMU data 124, the wheel odometer image, and wheel encoder data. An output may be generated by the location fuser 108 indicative of localization and/or pose of the vehicle with respect to global map coordinates (e.g., based on the map-to-odometer transformation output 132 and the odometer-to-vehicle transformation output 134).

As previously discussed, "odometer" to "vehicle" transform is obtained from the dead reckoning and it is transform maintainer 106 module's task to ensure "map" to "odometer" transformation (correction transformation), is available and updated periodically. In the beginning of localization, correction transformation is calculated from the GPS until a high confidence sensor pose estimate is achieved. In case the transform maintainer 106 does not receive any sensor pose estimates, it keeps re-publishing the last correction to continue localization based on dead reckoning. If the vehicle localizes on pure dead reckoning without any sensor correction more than certain travel distance, transform maintainer 106 starts to use GPS back as the primary source of correction transformation.

Sensor correction may cause a sudden jump on localization if the last correction is received greater than a threshold amount of time in the past. A linear interpolation between the last correction and current correction may be implemented and the current correction gradually applied in time. This provides smooth output without causing any lag which is usually the case with the low pass filter based smoothing.

In this way, sensor data from multiple sensors may be merged into a single scan, which may be adjusted by the scan accumulator 102 for motion compensation. Because fusion of different sensors may be performed by the location fuser 108, including fusion of features, such as LiDAR, wheel odometry, CAN data 122, IMU data 124, GPS data 120, ground reflectivity, vertical features, roach marker features, etc., the system 100 for robust localization implements fail-safes accounting for failures of different components, such as the sensors or the GPS, for example.

The system 100 for robust localization may be implemented via a processor 152 and a memory 154, and one or more of the scan accumulator 102, the scan matcher 104, the transform maintainer 106, and/or the location fuser 108 may be implemented via the processor 152 or the memory 154. In other words, the processor 152 and/or the memory 154 may be utilized to perform one or more of the above described calculations, receiving of data, data fusion, etc.

Figure 2:
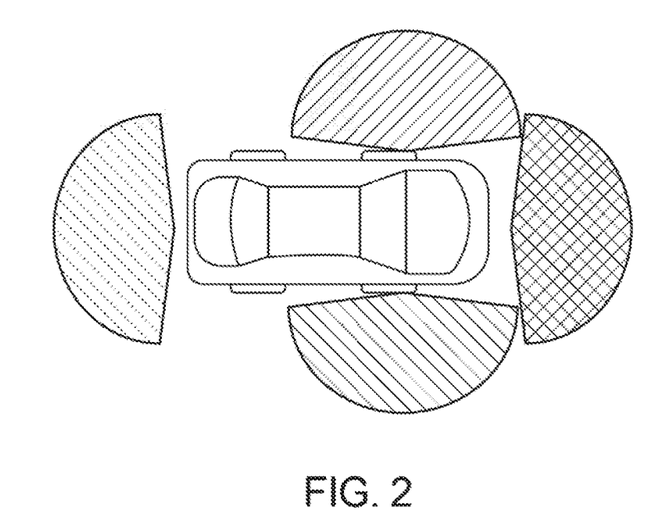
FIG. 2 is an exemplary implementation of a system for robust localization, according to one aspect.

FIG. 2 is an exemplary implementation of a system 100 for robust localization, according to one aspect. As seen in FIG. 2, there may be multiple sets of sensors mounted on a vehicle, each with its own FOV.

Figure 3:
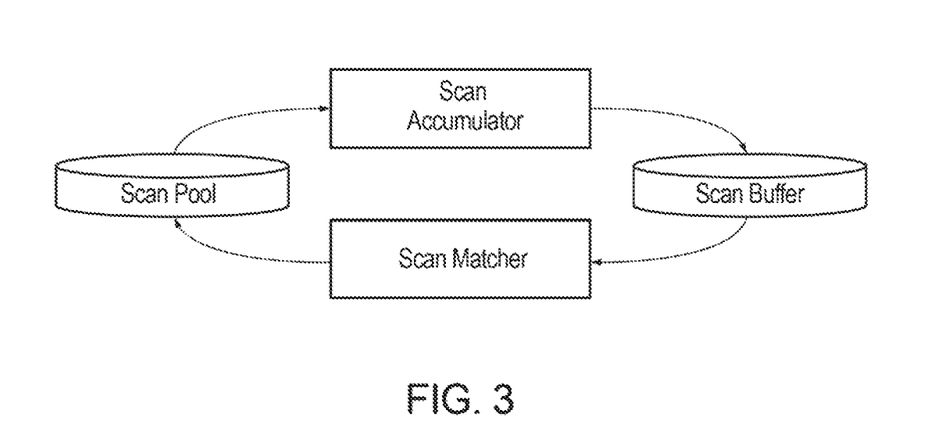
FIG. 3 is an exemplary data structure associated with the system for robust localization of FIG. 1, according to one aspect.

FIG. 3 is an exemplary data structure associated with the system 100 for robust localization of FIG. 1, according to one aspect. Scans may be accumulated efficiently based on this architecture. In order to increase memory efficiency as well as to enable multi-threading, this data structure (e.g., concurrent object buffer) may be implemented. The concurrent object buffer may include two thread-safe scan queues: a scan pool and a scan buffer. The scan pool may be used as a memory reserve for accumulated scans and may reduce the frequency of memory allocation or deallocation operations. When a scan (e.g., sensor data) is received, a pre-allocated scan may be borrowed from the scan pool, its contents updated with the new received scan, prepare scan for accumulation, and push into the scan buffer to be used later in the scan matcher 104.

Figure 4:
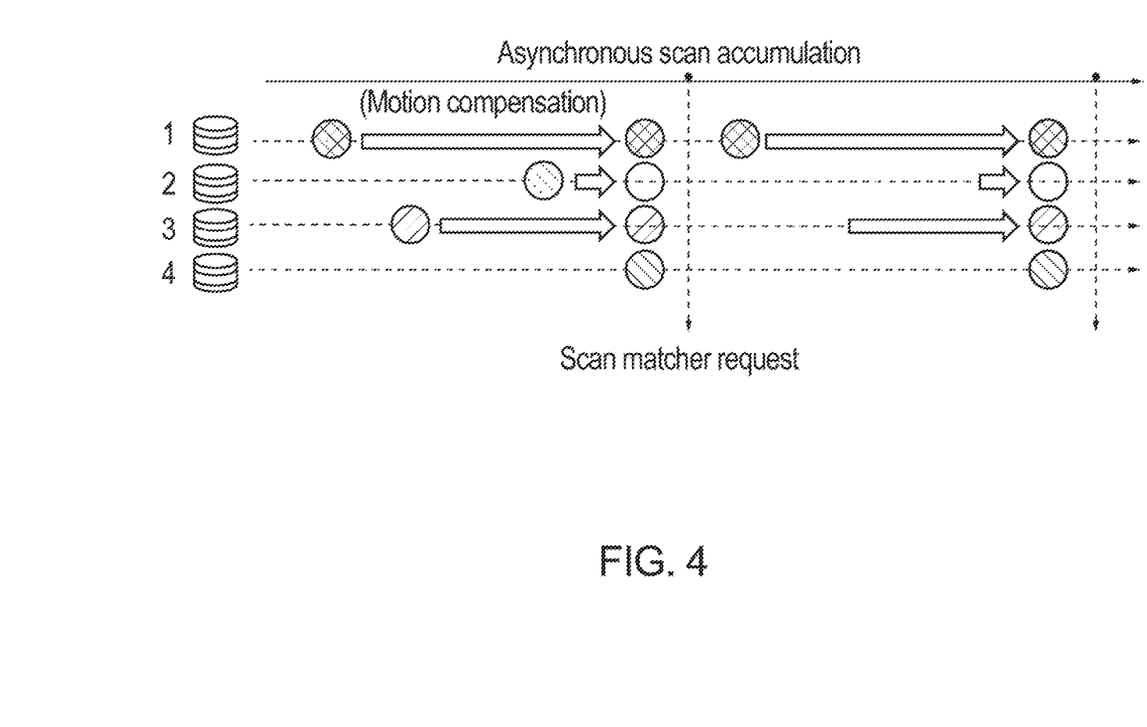
FIG. 4 is an exemplary scenario associated with robust localization, according to one aspect.

FIG. 4 is an exemplary scenario associated with robust localization, according to one aspect. Here, the scan accumulator 102 may transform each sensor data to a common coordinate frame and project the same back to a common time. In this way, dead reckoning may be utilized.

Figure 5:
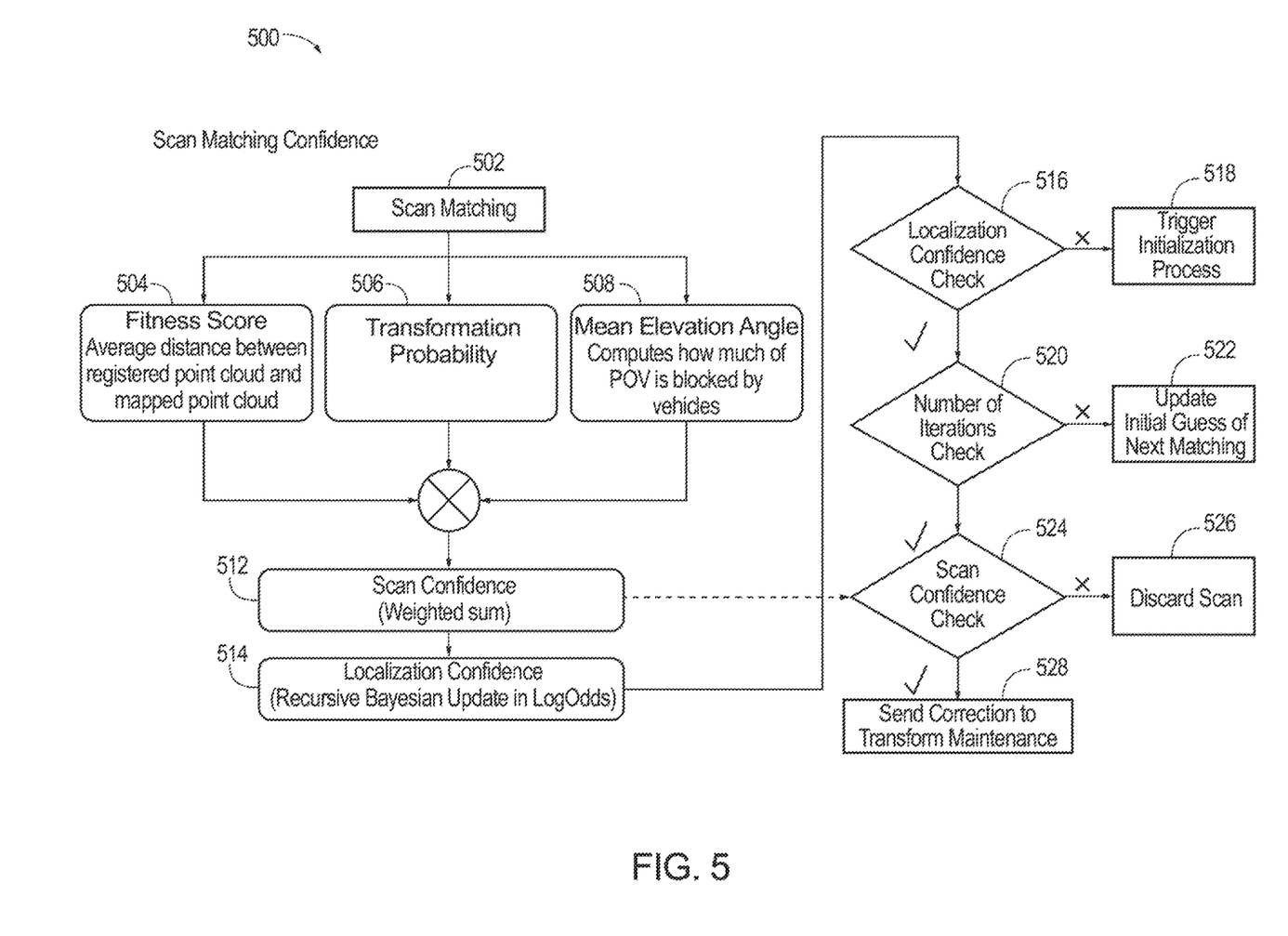
FIG. 5 is an exemplary flow diagram of a method for robust localization, according to one aspect.

FIG. 5 is an exemplary flow diagram of a method for robust localization, according to one aspect. The method 500 may include scan matching 502, calculating 504 a fitness score, calculating 506 a transformation probability, calculating a mean elevation angle 508, calculating 512 a scan confidence, calculating 514 a localization confidence, performing 516 a localization check, performing 518 an initialization process if the localization check fails, checking 520 a number of iterations, updating 522 an estimate if the check fails, performing 524 a scan confidence check, discarding 526 the scan if the scan confidence check fails, and calculating 528 a correction and sending the correction to the transform maintainer 106.

Figure 6:
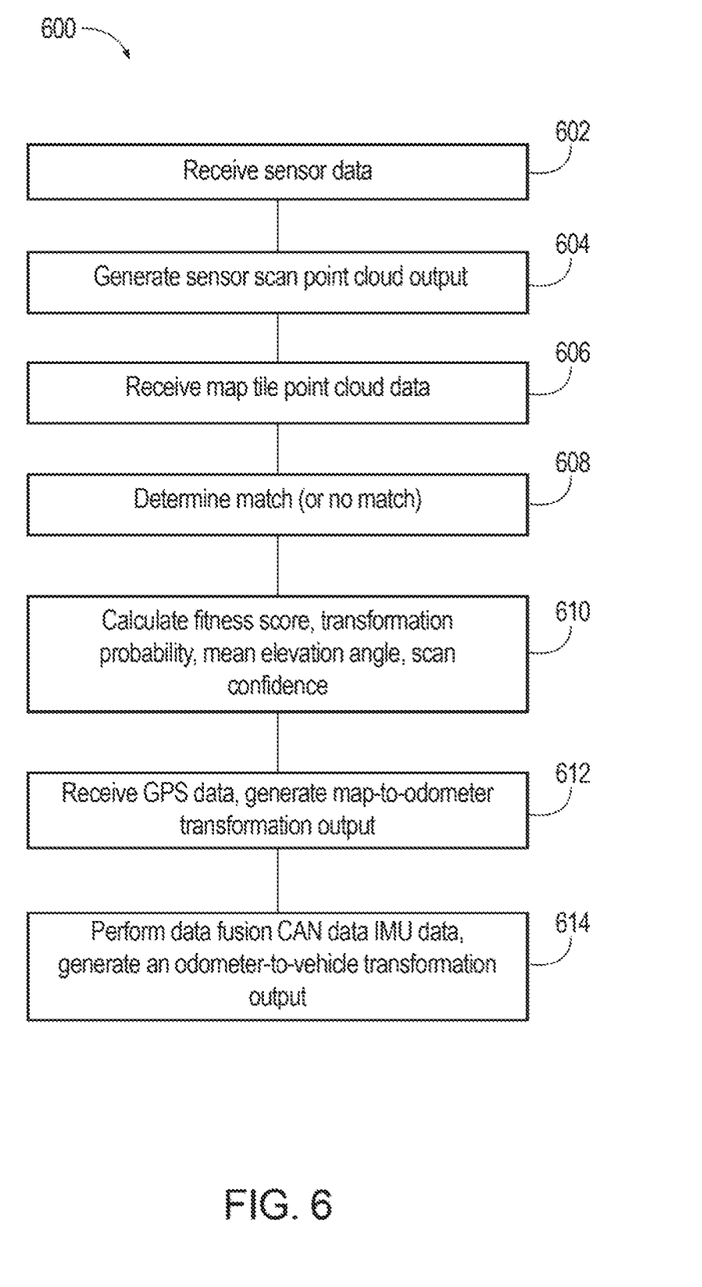
FIG. 6 is an exemplary flow diagram of a method for robust localization, according to one aspect.

FIG. 6 is an exemplary flow diagram of a method 600 for robust localization, according to one aspect. The method 600 may include receiving 602 a set of sensor data from the set of sensors 110 mounted on a vehicle, each sensor data of the set of sensor data is associated with a different FOV, each sensor data of the set of sensor data including one or more sensor frames associated with one or more corresponding timestamps, generating 604 a sensor scan point cloud output by transforming the set of sensor data from each sensor frame to a corresponding vehicle frame, receiving 606 map tile point cloud data from a map tile server 112 and the sensor scan point cloud output, the map tile point cloud data indicative of transformed point cloud data associated with a coarse vehicle location, determining 608 a match based on the sensor scan point cloud output and the map tile point cloud data, calculating 610 a fitness score, a transformation probability, and a mean elevation angle and determining a scan confidence associated with the sensor scan point cloud output based on the fitness score, the transformation probability, and the mean elevation angle, receiving 612 GPS data, the scan confidence, and the matched sensor scan point cloud output and map tile point cloud data and generating a map-to-odometer transformation output 132 based on the scan confidence, the GPS data, and the matched sensor scan point cloud output and map tile point cloud data, and performing 614 data fusion on CAN data 122 and IMU data 124 and generating an odometer-to-vehicle transformation output 134 based on the CAN data 122 and the IMU data 124.

Figure 7:
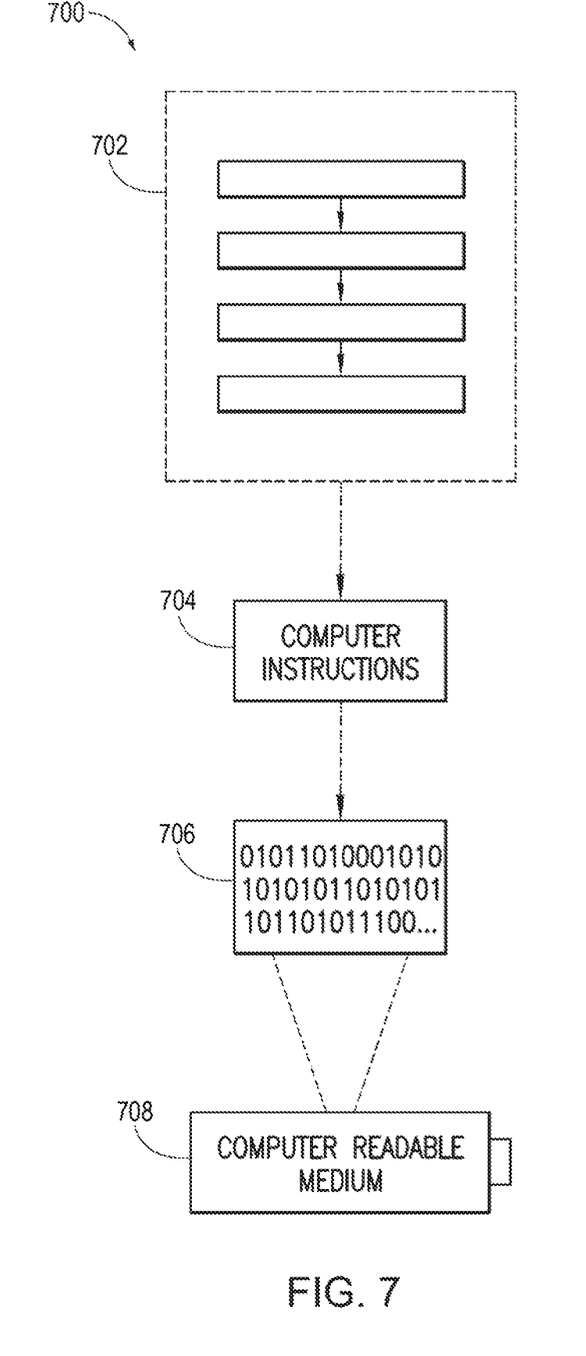
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, among others, on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 500 of FIG. 5 or the method 600 of FIG. 6. In another aspect, the processor-executable computer instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
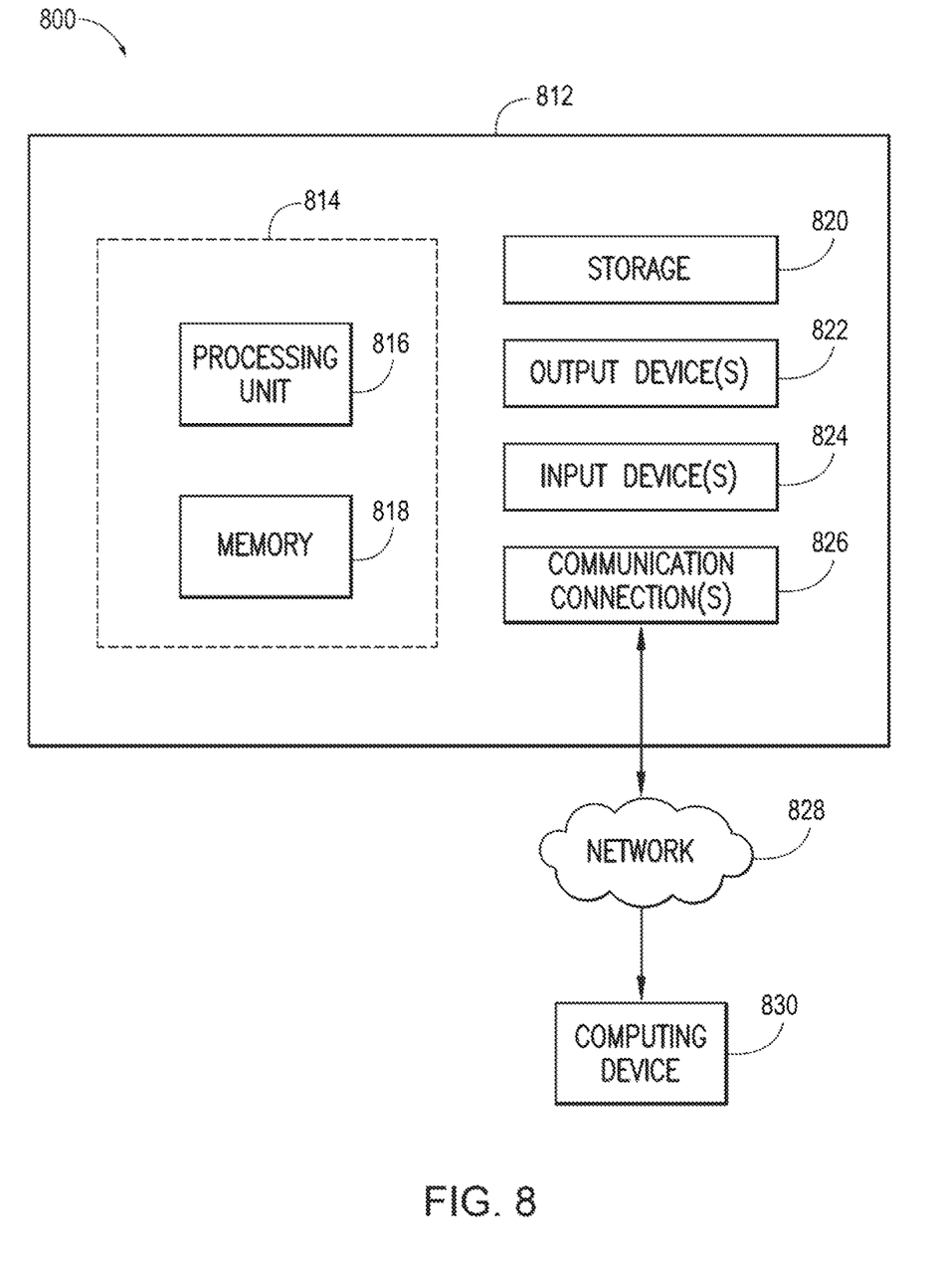
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, or a combination thereof. This configuration is illustrated in FIG. 8 by dashed line 814.

In other aspects, the computing device 812 includes additional features or functionality. For example, the computing device 812 may include additional storage such as removable storage or non-removable storage, including magnetic storage, optical storage, among others. Such additional storage is illustrated in FIG. 8 by storage 820. In one aspect, computer readable instructions to implement one aspect provided herein are in storage 820. Storage 820 may store other computer readable instructions to implement an operating system, an application program, among others. Computer readable instructions may be loaded in memory 818 for execution by processing unit 816, for example.

The term "computer readable media" as used herein includes computer storage media. Computer storage media includes volatile and non-volatile, removable and non-removable media implemented in any method or technology for storage of information such as computer readable instructions or other data. Memory 818 and storage 820 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for robust localization, comprising:
a scan accumulator receiving a set of sensor data from a set of sensors mounted on a vehicle, each sensor data of the set of sensor data is associated with a different field-of-view (FOV), each sensor data of the set of sensor data including one or more sensor frames associated with one or more corresponding timestamps, wherein the scan accumulator generates a sensor scan point cloud output by transforming the set of sensor data from each sensor frame to a corresponding vehicle frame;
a scan matcher receiving map tile point cloud data from a map tile server and the sensor scan point cloud output from the scan accumulator, the map tile point cloud data indicative of transformed point cloud data associated with a coarse vehicle location, wherein the scan matcher determines a match based on the sensor scan point cloud output and the map tile point cloud data,
wherein the scan matcher calculates a fitness score, a transformation probability, and a mean elevation angle and determines a scan confidence associated with the sensor scan point cloud output based on the fitness score, the transformation probability, and the mean elevation angle;
a transform maintainer receiving global positioning system (GPS) data from a GPS unit, the scan confidence, and the matched sensor scan point cloud output and map tile point cloud data from the scan matcher, wherein the transform maintainer generates a map-to-odometer transformation output based on the scan confidence by using a first set of data when the scan confidence is greater than a scan confidence threshold and a second set of data when the scan confidence is less than the scan confidence threshold, the GPS data, and the matched sensor scan point cloud output and map tile point cloud data; and
a location fuser performing data fusion on controller area network (CAN) data and inertial measurement unit (IMU) data and generating an odometer-to-vehicle transformation output based on the CAN data and the IMU data.

2. The system for robust localization of claim 1, wherein the scan matcher calculates a localization confidence based on the scan confidence using recursive Bayesian updating.

3. The system for robust localization of claim 2, wherein the transform maintainer generates the map-to-odometer transformation output based on the localization confidence, the GPS data, and the matched sensor scan point cloud output and map tile point cloud data.

4. The system for robust localization of claim 3, wherein the transform maintainer generates the map-to-odometer transformation output based on the GPS data when the scan confidence is less than a scan confidence threshold and when the localization confidence is less than a localization confidence threshold.

5. The system for robust localization of claim 3, wherein the transform maintainer generates the map-to-odometer transformation output based on the matched sensor scan point cloud output and map tile point cloud data when the scan confidence is greater than a scan confidence threshold and when the localization confidence is greater than a localization confidence threshold.

6. The system for robust localization of claim 1, wherein the scan matcher determines the match between the sensor scan point cloud output and the map tile point cloud data based on a normal distribution transform (NDT).

7. The system for robust localization of claim 1, wherein the fitness score represents an average distance between the sensor scan point cloud output and the map tile point cloud.

8. The system for robust localization of claim 1, wherein the transformation probability represents an accumulated mahalanobis distance associated with normal distribution transform (NDT) optimization.

9. The system for robust localization of claim 1, wherein the mean elevation angle represents an amount of FOV blocked by obstacles surrounding the vehicle.

10. The system for robust localization of claim 1, wherein the scan confidence is calculated as a weighted sum of the fitness score, the transformation probability, and the mean elevation angle.

11. The system for robust localization of claim 1, wherein the map tile point cloud data is represented as a voxel associated with a mean and a covariance.

12. The system for robust localization of claim 1, wherein the scan accumulator projects the set of sensor data back to a common timestamp.

13. The system for robust localization of claim 1, wherein the set of sensors include a light detection and ranging (LiDAR) sensor, a radar sensor, or an image capture sensor.

14. The system for robust localization of claim 1, wherein the location fuser performs data fusion using an extended Kalman filter (EKF).

15. A method for robust localization, comprising:
receiving a set of sensor data from a set of sensors mounted on a vehicle, each sensor data of the set of sensor data is associated with a different field-of-view (FOV), each sensor data of the set of sensor data including one or more sensor frames associated with one or more corresponding timestamps;
generating a sensor scan point cloud output by transforming the set of sensor data from each sensor frame to a corresponding vehicle frame;
receiving map tile point cloud data from a map tile server and the sensor scan point cloud output, the map tile point cloud data indicative of transformed point cloud data associated with a coarse vehicle location;
determining a match based on the sensor scan point cloud output and the map tile point cloud data;
calculating a fitness score, a transformation probability, and a mean elevation angle and determining a scan confidence associated with the sensor scan point cloud output based on the fitness score, the transformation probability, and the mean elevation angle;
receiving global positioning system (GPS) data, the scan confidence, and the matched sensor scan point cloud output and map tile point cloud data and generating a map-to-odometer transformation output based on the scan confidence by using a first set of data when the scan confidence is greater than a scan confidence threshold and a second set of data when the scan confidence is less than the scan confidence threshold, the GPS data, and the matched sensor scan point cloud output and map tile point cloud data; and
performing data fusion on controller area network (CAN) data and inertial measurement unit (IMU) data and generating an odometer-to-vehicle transformation output based on the CAN data and the IMU data.

16. The method for robust localization of claim 15, comprising calculating a localization confidence based on the scan confidence using recursive Bayesian updating.

17. The method for robust localization of claim 16, comprising generating the map-to-odometer transformation output based on the GPS data when the scan confidence is less than a scan confidence threshold and when the localization confidence is less than a localization confidence threshold.

18. The method for robust localization of claim 16, comprising generating the map-to-odometer transformation output based on the matched sensor scan point cloud output and map tile point cloud data when the scan confidence is greater than a scan confidence threshold and when the localization confidence is greater than a localization confidence threshold.

19. The method for robust localization of claim 16, comprising determining the match between the sensor scan point cloud output and the map tile point cloud data based on a normal distribution transform (NDT).

20. A system for robust localization, comprising:
a scan accumulator receiving a set of sensor data from a set of sensors mounted on a vehicle, each associated with different field-of-view (FOV), wherein the scan accumulator generates a sensor scan point cloud output by transforming the set of sensor data from each sensor frame to a corresponding vehicle frame;
a scan matcher receiving map tile point cloud data from a map tile server and the sensor scan point cloud output from the scan accumulator, the map tile point cloud data indicative of transformed point cloud data, wherein the scan matcher determines a match based on the sensor scan point cloud output and the map tile point cloud data,
wherein the scan matcher calculates a fitness score, a transformation probability, and a mean elevation angle and determines a scan confidence associated with the sensor scan point cloud output based on the fitness score, the transformation probability, and the mean elevation angle,
wherein the scan matcher calculates a localization confidence based on the scan confidence using recursive Bayesian updating;
a transform maintainer generates a map-to-odometer transformation output based on global positioning system (GPS) data from a GPS unit, the scan confidence by using a first set of data when the scan confidence is greater than a scan confidence threshold and a second set of data when the scan confidence is less than the scan confidence threshold, the localization confidence, and the matched sensor scan point cloud output and map tile point cloud data from the scan matcher; and
a location fuser performing data fusion on controller area network (CAN) data and inertial measurement unit (IMU) data and generating an odometer-to-vehicle transformation output based on the CAN data and the IMU data.

* * * * *